(12) United States Patent
Banner et al.

(10) Patent No.: US 7,656,866 B2
(45) Date of Patent: Feb. 2, 2010

(54) CONTROLLING MEDIA SERVER RESOURCES IN A VOIP NETWORK

(75) Inventors: Barbara Leslie Banner, Hazlet, NJ (US); Thomas J. Dietrich, Green Brook, NJ (US); Jay Dobin, Highland Park, NJ (US); Christopher Hefele, Hoboken, NJ (US); James A. Ibezim, Wayside, NJ (US); James William Murphy, Wall, NJ (US); Dominic M. Ricciardi, Bridgewater, NJ (US); Robert Stokey, Jr., Manville, NJ (US)

(73) Assignee: AT&T Corp., New York, NY (US)

( * ) Notice: Subject to any disclaimer, the term of this patent is extended or adjusted under 35 U.S.C. 154(b) by 137 days.

(21) Appl. No.: 11/321,760

(22) Filed: Dec. 29, 2005

(65) Prior Publication Data

US 2006/0239257 A1    Oct. 26, 2006

Related U.S. Application Data

(60) Provisional application No. 60/674,244, filed on Apr. 22, 2005.

(51) Int. Cl.
*H04L 12/66* (2006.01)

(52) U.S. Cl. .................. 370/356; 370/229; 370/230; 370/351; 370/352; 370/353; 370/354; 370/355; 379/201.01; 379/220.01; 379/221.02; 709/201; 709/202; 709/203; 709/229; 709/235; 709/243; 709/244

(58) Field of Classification Search .............. 379/88.25, 379/88.17, 201.01, 220.01, 221.02; 370/400, 370/351–356, 229–230; 709/201–203, 229, 709/235, 243–244
See application file for complete search history.

(56) References Cited

U.S. PATENT DOCUMENTS

| 6,289,010 | B1 * | 9/2001 | Voit et al. ............. 370/352 |
| 6,600,735 | B1 * | 7/2003 | Iwama et al. ........... 370/352 |
| 6,718,359 | B2 * | 4/2004 | Peless et al. ........... 718/105 |
| 6,765,872 | B1 * | 7/2004 | Tazaki ................. 370/235 |

(Continued)

OTHER PUBLICATIONS

PCT Written Opinion mailed Aug. 29, 2006, 11 pages.

(Continued)

*Primary Examiner*—Hemant Patel

(57) ABSTRACT

Methods of controlling media server resources in a VoIP network are disclosed. In an embodiment, an IP node provides a service request. An application server receives the service request and sends a request for media server resources to a media server resource broker. The media server resource broker determines that the request should be handled by a first media server. The media server resource broker queries the first media server to obtain an IP address and port number for use in establishing a call between the IP node and the first media server. The media server resource broker then provides a signal to the IP Node so that it can establishing the call with the appropriate port on the media server. In an embodiment, the media server resource broker updates a database module that tracks assignment levels of the first media server so as to reflect the most recent request, thus decreasing the number of ports available for the first media server. When the call is complete, the media server resource broker, being in the signal path, can update the assignment level of the first media server.

10 Claims, 8 Drawing Sheets

U.S. PATENT DOCUMENTS

| | | | | |
|---|---|---|---|---|
| 7,072,451 B2 * | 7/2006 | Reynolds | ............... | 379/88.16 |
| 7,221,945 B2 * | 5/2007 | Milford et al. | ............ | 455/452.1 |
| 7,330,463 B1 * | 2/2008 | Bradd et al. | ............... | 370/352 |
| 2002/0087722 A1 * | 7/2002 | Datta et al. | ............... | 709/239 |
| 2002/0133611 A1 | 9/2002 | Gorsuch et al. | | |
| 2002/0186685 A1 * | 12/2002 | O'Brien et al. | ............ | 370/352 |
| 2003/0051037 A1 * | 3/2003 | Sundaram et al. | .......... | 709/227 |
| 2003/0101278 A1 * | 5/2003 | Garcia-Luna-Aceves et al. | ........... | 709/240 |
| 2005/0138193 A1 * | 6/2005 | Encarnacion et al. | ...... | 709/230 |
| 2006/0120385 A1 * | 6/2006 | Atchison et al. | ............ | 370/400 |
| 2006/0146801 A1 * | 7/2006 | Kayser et al. | ............... | 370/352 |
| 2006/0176840 A1 * | 8/2006 | Bloch et al. | ................ | 370/315 |

OTHER PUBLICATIONS

A Framework for Conferencing with the Session Intitiation Protocol draft-ietf-sipping-conferencing-framework-04, by J. Rosenberg, Cisco System, Feb. 21, 2005, 29 pages.

An Application Server Component Architecture for SIP, by Rosenberg, Mataga, Schulzrinne, dynamicsoft/Columbia U., Mar. 2, 2001, 39 pages.

Media Control Protocol Framework draft-dolly-scon-mediacntrlframe-00.txt, by M. Dolly, G. Munson, AT&T Labs, J. Rafferty, Brooktrout, Oct. 12, 2005, 9 pages.

AT&T, Common VoIP Architecture, AT&T Point of View, Dec. 22, 2003, pp. 1-21, AT&T, USA.

Garland Sharratt, Proposal for Media Resource Broker Element, Multiservice Switching Forum, Jan. 18, 2005, pp. 1-7, Freemont, CA, USA.

VoiceGenie 7 SIP Proxy Users' Guide, Apr. 13, 2005, pp. 1-34, VoiceGenie Technologies, Inc., Toronto, Ontario, Canada.

AT&T, Media Server Resource Broker—Needs and Call Flows, Aug. 8-12, 2005, pp. 1-9, ATIS PTSC- SAC, Washington, DC, USA.

Walker, Stuart, Media Resource Broker, MultiService Forum, 2005, pp. 1-14, USA.

* cited by examiner

CONTROLLING MEDIA SERVER RESOURCES IN A VOIP NETWORK

BACKGROUND OF THE INVENTION

This application claims the benefit of provisional application No. 60/674,244, filed on Apr. 22, 2005, which is incorporated by reference in its entirety herein, and is related to co-pending application Ser. No. 11/321,734, filed Dec. 29, 2005, which is not admitted as prior art with respect to the present disclosure by its mention in this section.

FIELD OF THE INVENTION

The present invention relates to the field of managing media server resources in a network configured for use with VoIP.

DESCRIPTION OF RELATED ART

The use of VoIP is known. Basically, VoIP involves using a codec, such as but not limited to G.711 with mu-law, to encode a person's audible conversation (which is analog) into data packets (that are digital) so that the digital packets can be sent over an Internet Protocol (IP) network. As is known, IP networks may carry other kinds of traffic besides voice, such as video or fax in addition to data services (file transfer, email, instant messaging, etc.). Such converged or consolidated networks have economic and operational benefits to network providers and users.

VoIP services may involve media-based caller interactions with equipment inside the network, typically Media Servers. Such interactions may be, for example but without limitation, for dual tone multi-frequency (DTMF) or speech prompt-and-collect routines (which may, for example, be used for Toll-Free services or retrieving voicemail), for hearing announcements, or for participating in audio conference calls. That notion generalizes to services other than VoIP, more generally known as Services over IP (SOIP) that could include, for example but without limitation, fax store and forward or video conferencing.

The logic driving how a media server provides a particular service may be provided by an application server. The basic architecture for using application servers with media servers is known. However, there may be numerous applications servers working with a larger number of media servers. Therefore, something is needed to manage the utilization of the media servers with respect to the various application servers.

BRIEF SUMMARY OF THE INVENTION

Aspects of the invention relate to a method for managing media server resources assigned to VoIP calls, and more generally to SoIP. In an embodiment, an application server receives a service request originating from an IP node such as a VoIP phone or other customer equipment. In response, the application server requests media server resources to provide the requested service. The media server resource request may be passed to a media server resource broker. The media server resource broker determines an appropriate media server to provide the requested service and queries the media server to determine an IP address. The media server resource broker can then cause the media server to be connected to the IP node. The application server can then provide the logic that allows the media server to manage a call with the IP node.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

As noted above, the architecture for providing VoIP is known and one example is disclosed in a white paper entitled "Common VoIP Architecture," AT&T Point Of View/VoIP, Dec. 22, 2003 and this paper is incorporated by reference in its entirely herein. However, motivated by the benefits of sharing, there may be numerous applications servers (AS) supporting various services working with a shared pool of media servers (MS).

The use of a shared pool of MSs can make more efficient use of the resources used to provide VoIP. For example, greater efficiencies are possible if MS resources are managed at a regional level. As the number of MSs being managed increases and the locations of the MSs becomes more dispersed, the additional efficiencies that may be obtained are even more noticeable.

Figure 1:
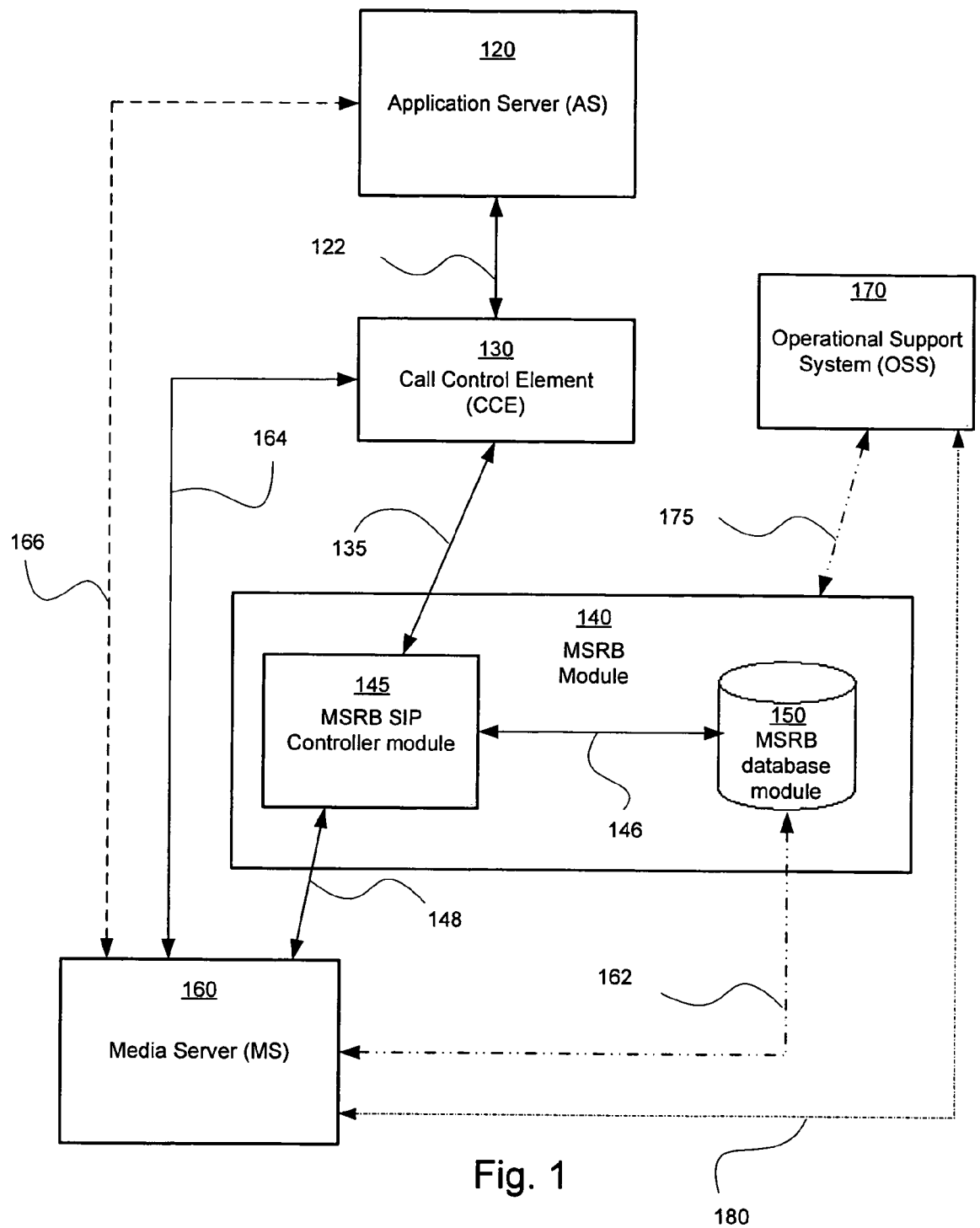
FIG. 1 illustrates a schematic of an embodiment of a system for use in distributing VOIP in accordance with an aspect of the present invention.

Turning to FIG. 1, a high level schematic of a system is disclosed. It should be noted that each of the elements depicted in the system may be a module comprising one or more physical or logical elements linked together. An AS 120 is illustrated as connected to a call control element (CCE) 130. In general, an AS can provide services to users of the telephone system such as voice mail and these services may include network resources such as a lightweight directory access protocol (LDAP) lookup. The AS can also handle the logic behind connecting multiple parties to a multicast conference and can provide a script for interacting with users through the providing of audible prompts and the collection of responses to those prompts. Therefore, an AS can provide the logic necessary to provide a caller with the desired services and is not limited to the use of a particular protocol in communicating with other devices. Typically, an AS will be programmed for specific functionality. Thus, in an embodiment, the AS may be programmed to provide the logic needed to handle a call to a call center by providing instructions to play one or more recorded messages, to provide structured responses to user inputs and to process received digits as is common in interactive voice response (IVR) interfaces.

Typically, the AS 120 will not perform the media interaction with the end-user itself but may instead provide instructions to a MS 160. In an embodiment, the MS 160 may include a speech recognition engine, a conferencing bridge, a Text-To-Speech (TTS) engine, or may play recorded messages and collect digits entered by the caller so that the individual may interact with the logic provided by the AS 120.

The AS 120 potentially could interact with the signals received from the incoming call, which may be provided using Session Initiation Protocol (SIP), directly. However, it may preferably use a call control element (CCE) to act as a proxy for the AS 120. Therefore, incoming calls can be routed by the CCE and call legs can be added, modified or removed by the CCE as desired, under the guidance of service logic in an AS. Thus, as depicted in FIG. 1, the CCE 130 allows the AS 120 to ignore the details of how the calls access or egress the network so that the AS 120 can instead focus on the logic of how the calls are handled.

While the AS 120 may be configured so as to not directly handle incoming calls, a certain amount of information from incoming calls may be helpful to provide the desired service. Thus, the AS 120 can be configured to communicate with the CCE 130. One method of communicating between an AS and the CCE 130 is the use of the SIP. Additionally, the AS 120 can be configured to communicate with the MS 160 to instruct it on what do with respect to the media interaction with the caller. Such communication may involve, for example but without limitation, Media Sessions Markup Langauge (MSML) and Media Objects Markup Language (MOML) or Voice eXtensible Markup Language (VXML).

Figure 8:
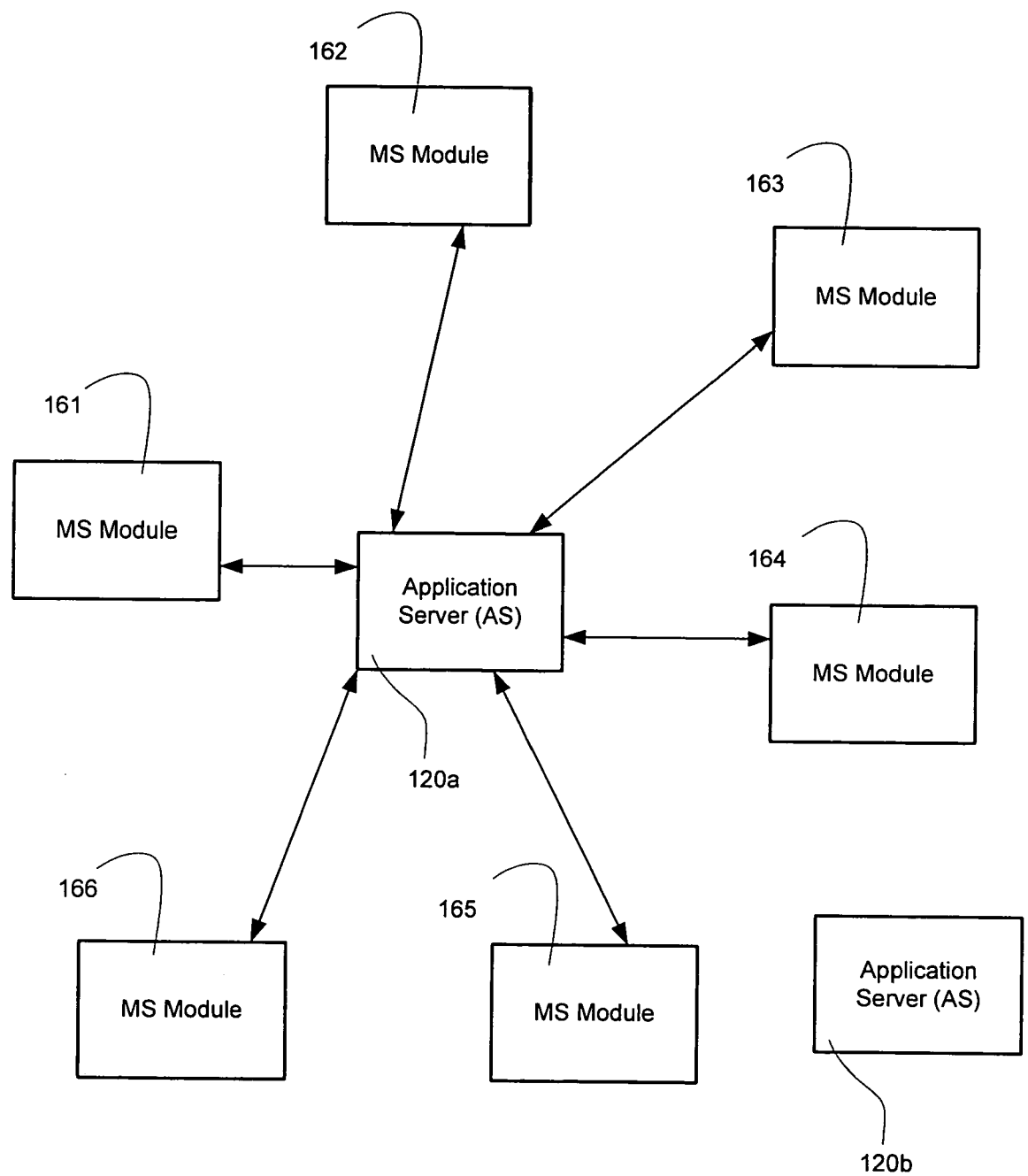
FIG. 8 illustrates an embodiment of a schematic of a distributed set of media servers in accordance with an aspect of the present invention.

The AS 120, the CCE 130 and the MS 160 handle the instructions and the details of processing calls. However, as depicted in FIG. 8, AS 120*a* may interact with MS modules 161-166, where each MS module is situated in a different region. As used herein, each MS module may consist of one or more physical servers and the region may consist of a physical site, a city, a county, a state or a country. Thus, management at a regional level would manage two or more regions. It should be noted that the provision of MSs in different regions has the benefit of being able to provide services to individuals located near or in those regions without the need to span vast distances. However, efficient utilization of the various MSs becomes more complex because simply being aware of what is happening in a particular region does not ensure that the total available MS resources in all the regions are being utilized efficiently.

Additional ASs such as AS 120*b* may also use the MS 161-166 (the connections not shown between AS 120*b* and the MSs within FIG. 8 for the purpose of improving clarity). However, as the AS 102*a* and the AS 120*b* may be operating independently, may support different services, and may be provided by different service providers, neither the AS 120*a*, the AS 120*b* or the MS 161 can be expected to be aware of the load on the MS 161 with respect to other MSs.

Therefore, to help improve resource utilization, a media server resource broker (MSRB) 140 may be utilized. The MSRB 140 receives requests for MS services and determines the appropriate MS to provide the requested service, depending on the request and current utilization of MSs. The MSRB 140 may consider additional parameters related to utilization other than a simple percentage of usage of available bandwidth such as, but not limited to, geographical origin of the call, proximity of the origin of the call to the various MSs, capabilities of the MS, the number of call legs that need to be supported, the type of resources needed (e.g. whether a speech recognition engine or a digit collection will be required), the length of time the call legs will be active, future reservations (e.g., minimum capacity for a given service, or an upcoming scheduled conference call) and any other parameter that may affect the utilization of the MS and, therefore, the delivery of the desired service. Some of the information that the MSRB 140 employs for selecting MS resources may come in attributes of the request from the AS 120, such as, but without limitation, the type of codec needed for the ports, likely duration of port usage, geographic preference, number of ports needed, preference for control protocol (such as VXML or Media Server Control Markup Language (MSCML) or Media Resource Control Protocol (MRCP) or the like), conference identification number (for scheduled conference calls), the customer service the request is being made for or whether DTMF collection or a type of speech recognition is needed.

For example, returning to FIG. 1, the MSRB SIP controller 145 may receive a request for a MS with speech recognition capability. The request can include a demand for one hundred ports for a period of two hours. It should be noted that as used herein, the term port is not limited to a physical port but instead refers to a logical port. Thus, a port can be considered to be a unit of bandwidth and processing power and capabilities sufficient for providing a desired service for each incoming call. Therefore, the need for one hundred logical ports may be satisfied by using a portion of a single physical port that has sufficient capacity to handle one hundred or more calls simultaneously. Moreover, it suffices for the MSRB to identify an MS address where ports of a desired type can be accessed, and track resource assignment at that level, as opposed to identifying and tracking the assignment of individual ports.

The MSRB SIP controller 145, which may be a server, can query the MSRB database 150 to determine current utilization, planned utilization and capacity of all the available MSs in the network. Continuing with the above example, after determining that the MS 160 has sufficient capacity to provide one hundred ports for 2 hours, the address of the MS 160 may be provided to the AS 120 via the CCE 130. In an embodiment, the AS and CCE will then deal directly with the MS 160 along connections 122 and 164 to set up call legs to the MS 160 without further involvement of the MSRB 140. In an alternative embodiment, the signals will flow through the CCE 130 to the MSRB 140 and onto the MS 160. These two methods will be discussed in greater detail below.

When the MSRB 140 provides the AS with the identification of an MS that can provide the requested services, the MSRB 140 stores the usage of the MS in the MSRB database 150. Thus, to continue with the above example, future requests for MS services will take into account the fact that MS 160 has one hundred ports that are assigned for the two hour period. As the MSRB 140 receives requests for all ASs using the set of MSs on the network and the MSRB 140 keeps track of the assignment, based on both current requests and reservations, of all the MSs on the network, the MSRB 140 is able to provide greater utilization of the various MSs while ensuring that the service needed by each AS is provided.

While one hundred ports were requested for a period of two hours in the above example, it may be that after one hour almost all the ports are free. For example, if the MS 160 was providing IVR for customers calling in response to an advertisement such as an infomercial, the end of the infomercial might cause the number of incoming calls to be substantially reduced. Because the AS 120 is in the call signaling path, it is aware of how many call legs are connected to the MS 160 at any point in time. After one hour, the AS 120 handling the calls for the infomercial may decide that the incoming call volume is such that only 40 ports are needed for the last hour, and so the AS 120 at that point may free up 60 of the ports by notifying the MSRB 140 that that many may be returned to the MS idle pool. This approach can allow the MSRB to more effectively manage the network resources and may also provide other potential benefits. As depicted, a communication path 175 is provided between one or more Operations Support Systems (OSS) 170 and the MSRB 140 in order for the MSRB to keep track of actual MS utilization as a precaution against the MSRB 140 and set of AS getting out of synchronization due to such things as signaling errors or AS failures. The OSS may provide utilization updates that include factors such as per-service reservations, per-conference reservations, MS planned downtime, MS unplanned downtime, MS equipment additions and MS equipment deletions. In an embodiment, MS utilization information may come to the MSRB 140 from the MS 160 via the OSS 170 using path 180. In an alternative embodiment, the utilization information may be provided directly using path 162.

In an embodiment, instead of reducing the number of ports assigned, the AS 120 may instead request additional ports from the MSRB 140, if, for example, the call volume observed is higher than it had anticipated.

It should be noted, however, that not all requests may be fully met. For example, a request for X ports may be received for a first AS in conjunction with a request from a second AS for Y ports and a request for Z ports from a third AS and the sum of X and Y and Z may exceed the capacity of N ports that is available on the MS. As can be appreciated, different MSs have a different number of ports available and therefore may have a different utilization level. If the request for X ports from the first AS is related to a conference call, and the other requests are related to IVR, then one possible response is to grant the request for X ports to the AS and grant a portion of the requests for Y and Z ports to the second and third ASs. The second and third ASs can then decide whether to accept the partial provision. Assuming that both the second and third ASs do accept the partial provision, the MSRB notes the number of ports assigned for each AS request.

In addition, a request for X ports to support a conference call may overestimate (or underestimate) the number of callers that will connect and also may overestimate (or underestimate) the time the calls will be connected. Furthermore, an AS can change its request to the MSRB for how many ports or types of ports it wants. The MSRB also is aware of the utilization of the provided ports by the other ASs. Thus, as ports become available they can be shifted to support another AS, as is appropriate.

As depicted in FIG. 1, an operation support system (OSS) 170 is connected to the MSRB 140. In an embodiment, the OSS 170 can request the MSRB to schedule future utilization of resources in response to request for future service. For example, an individual planning to have a large conference call with 2000 call legs might want to schedule the conference call in advance so as to ensure all 2000 people planning to participate in the conference call can actually join the conference call. The MSRB could determine, based on any previously schedule utilization, the preferred MS to handle the conference call. It should be noted that the MSRB could also adjust the scheduled use of MSs so that a more consistent utilization level of each MS was provided. Thus, in an embodiment with a first and a second MS, the MSRB might shift the previously scheduled utilization of the first MS to the second MS and schedule the first MS to handle the new request. Changes may also be made in response to varying priorities (for example, an assignment of ports for a conference call may have a higher priority than an assignment of ports for IVR). Additional changes may be made in response to technical issues such as the loss of a MS. Thus, the MSRB provides a robust and efficient means of utilizing the MSs on the network.

As is well known in the use of VoIP technology, the underlying signaling among BE, CCE, MS and AS network elements and between the BE and SIP Phone would be some combination of protocols, for example without limitation, SIP, H.323, or Media Gateway Control Protocol (MGCP). In an embodiment using SIP, which could be employed between any two of the above elements, a series of request messages (e.g., INVITE, BYE, ACK) and response messages (e.g., 180 Alerting, 200 OK) are used to establish and clear media sessions. SIP messages convey address information, for example in the form of a SIP URI, to identify SIP signaling entities. SIP messages may also convey various types of payload information, including media information using the Session Description Protocol (SDP), in which case the SDP content would indicate such things as the media receive IP addresses and port numbers of the media endpoints and the characteristics of the media (e.g., G.726-encoded audio). The exchange of media addresses establishes the media connection. The media itself is transferred using a protocol such as the Real-time Transport Protocol (RTP).

Additionally, FIG. 1 is a representation of a VoIP network. The elements such as the BE, the CCE, the AS and the MS embody certain typical groupings of functions found in VoIP networks. Therefore, these elements should not be limited to disclosed embodiments but rather are directed to the elements that perform the discussed functions. For example, in an embodiment the BE may be a Session Border Controller, and may perform various security, policy and protocol interworking and transcoding functions with respect to network-external entities, which may include translating between network-internal and network-external addresses. In an embodiment, the CCE may be a Call Agent or Softswitch, and may perform basic call handling functions, such as routing or AS invocation and interaction. As can be appreciated, these elements are not so limited and other known variations of the various elements may be used as is appropriate.

Figure 2:
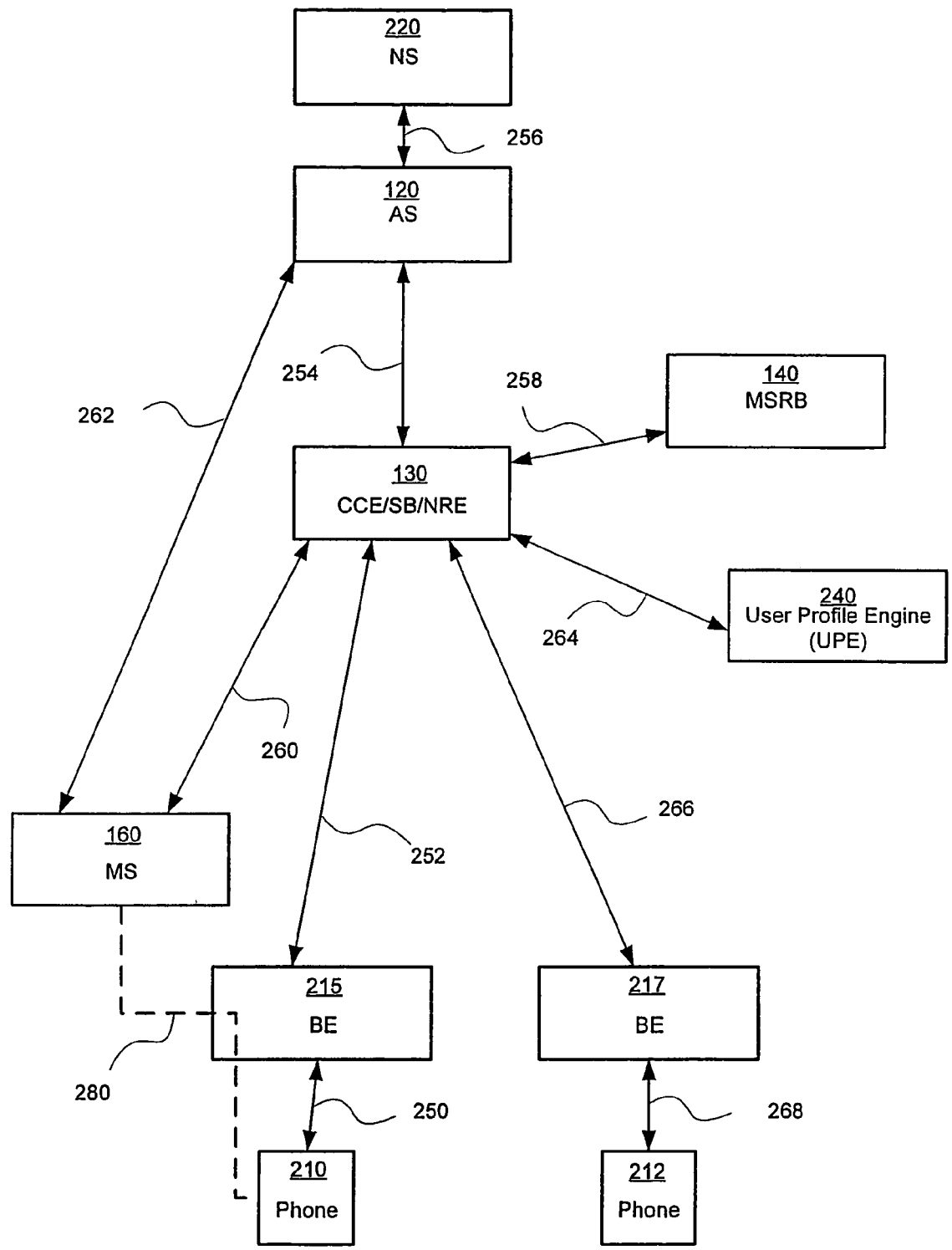
FIG. 2 illustrates a schematic of an embodiment of a system for use in distributing VOIP using an indirect method in accordance with an aspect of the present invention.
Figure 3:
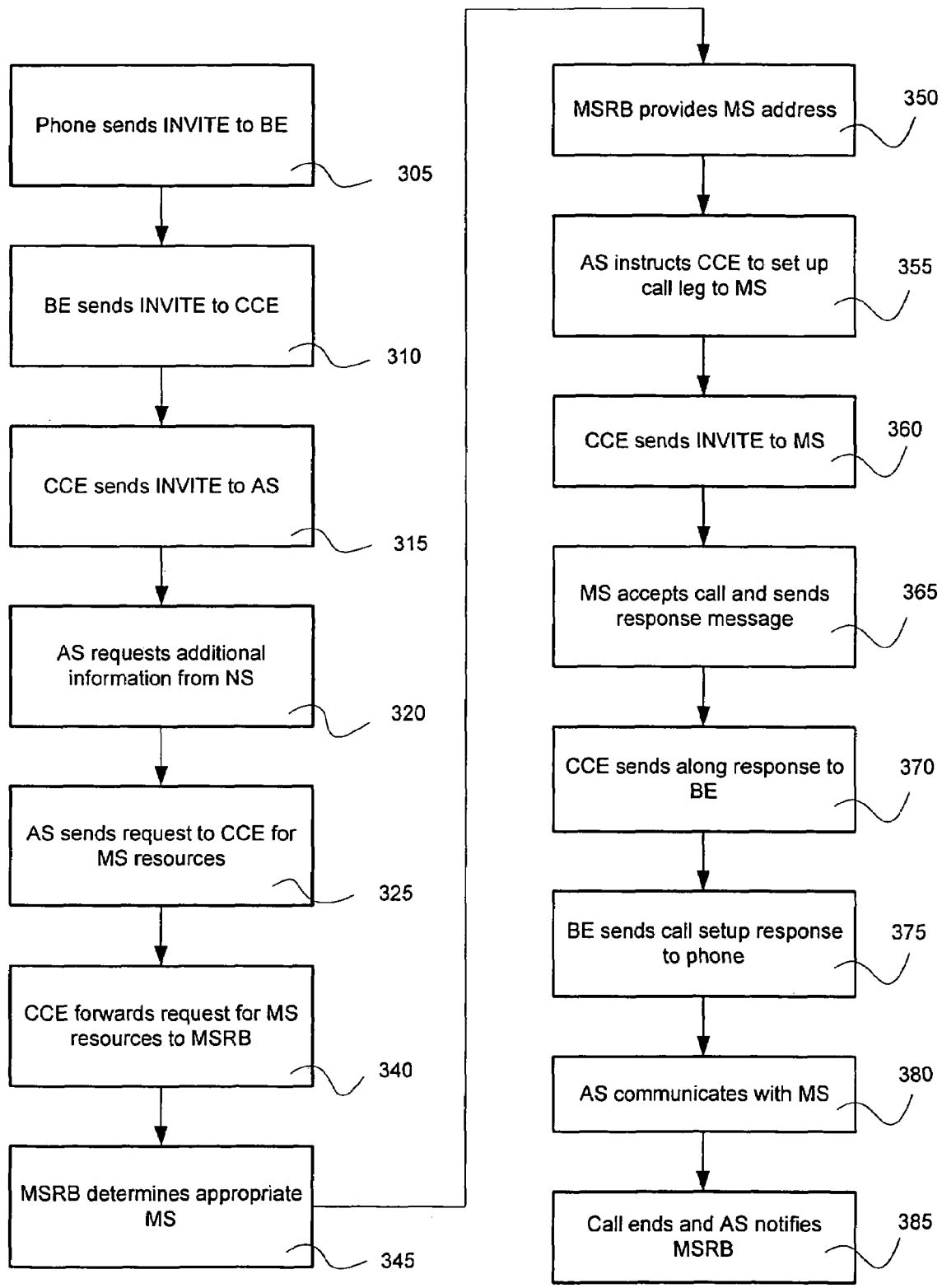
FIG. 3 illustrates an embodiment of a method of using the system depicted in FIG. 2 in accordance with an aspect of the present invention.

Turning to FIG. 2 and 3, an embodiment of a method of handling incoming calls is illustrated. First in step 305, a phone 210, which is an example of an IP node, sends an INVITE message, which is a format used in SIP, to a BE 215. The message may also be provided in any other known protocol and this message is an example of a service request. The INVITE message may include a destination address and/or some indication of the type of service desired. The BE 215 then determines whether to admit the call based on local policy (e.g. whether the incoming signaling is from an allowed IP address, or the requested call bandwidth is within allowed parameters). A SIP phone (such as, but not limited to, a Linksys RT41P2) is one example of a call origination device, and a call origination device may be connected directly to the network or via intermediate networks.

Next, after admitting the call, the BE 215 sends the INVITE message to the CCE 130 in step 310. Upon receipt of the message, the CCE 130 can query a service broker (SB) to determine if there is any service feature associated with the telephone number (TN) or other information in the INVITE. The SB may respond with the address of the appropriate AS. Then, in step 315, the CCE 130 sends the INVITE message to AS 120, which is the AS associated with the TN or other information contained in the INVITE.

In step 320, the AS 120 requests additional information from a network server (NS) 220. This request, which may be a directory request, may by provided by SOAP, LDAP, SMTP or some other protocol and may be directed to a server within the network supported by the MSRB or may be outside the network (e.g. somewhere on the Internet).

In step 325, the AS 120 sends an INVITE message to the CCE 130 requesting MS resources and desired MS attributes. In step 340 the CCE 130 forwards the request to MSRB 140. It should be noted that the MSRB 140 may consist of multiple servers and the CCE 120 may send a message to a different server via a round-robin fashion, however, a single logical database of activity for all the MSs associated with the MSRB 140 is required so that the MSRB 140 can keep track of the activity of all the MS resources. In other words, different MSRBs should not be able to use the same MS resources.

In step 345, the MSRB 140 determines the appropriate MS in light of the request and current/planned utilization levels. For conference calls it may be preferable to use a single MS to handle all the call legs for a given conference. For IVR type calls, however, multiple MS may be used effectively and therefore the MSRB 140 may determine that different MSs may provide a portion of the requested ports, either in a pure split or in a weighted allocation depending on the existing utilization of the various MSs.

In step 350 the MSRB 140 provides the MS address and any other appropriate information to the AS 120 via the CCE 130. If the AS request could not be granted as stated, the MSRB may respond with an alternative (e.g., 50 ports can be provided at a MS in the western United States, whereas the request was for 100 in the eastern United States). In step 355, the AS 120 instructs the CCE 130 to set up a call leg with the MS 160. In step 360, the CCE 130 sends an INVITE message to MS 160, requesting the MS 160 to participate in the call. In step 365, the MS 160 sends a response to the CCE 130, accepting the call. In step 370, the CCE 130 relays the response to BE 215. In step 375, the BE sends the response to the phone 210 so that the phone 210 and the MS 160 may establish a media link. In step 380, the AS 120 provides instructions to the MS 160 for handling the phone call from 210. If the AS 120 determines that some or all of the MS resources are no longer needed, for example a call or conference has ended or fewer ports are needed, it may communicate with the MSRB 140 to have all or some number of the ports returned to the MS idle resource pool. In an embodiment, the AS may determine the current need for ports does not correspond with initial request for the number, type or mix of types of ports. In addition, the currently-assigned ports may be needed for an additional period of time. For example, an AS may initially request a number of ports with G.711 coding, and at some subsequent time determine that a mix of three quarters of G.711 ports and one quarter G.726 ports are required. The AS can send a new request to the MSRB requesting the new mix. Depending on what MS resources are available and whether the MS resources currently assigned for that conference can also support G.726, the MSRB may respond to the AS with requested G.726 ports from the same MS resources or from a different MS resource.

It should be noted that the actual media stream travels between the phone 210 and the MS 160 via link 280 (via the BE 215), thus the prior discussion relates to the routing of requests for service and signals relating to providing service rather than the routing of the actual media stream, which may be provided in real-time transport protocol (RTP).

As can be appreciated, the above method allows a MSRB to make an initial determination of an appropriate MS for a conference call for up to X legs and provide the information to an AS. From that point on, additional call legs attempting to join the conference call can simply be sent by the AS to the already-known MS address for the MS resources handling that conference. The AS does not have to make a request to MSRB for each individual call. This "indirect" method of utilizing the MSRB, where the AS requests to MSRB for MS resources and notifies the MSRB when the MS resources are no longer being used in separate steps from the step of setting up of call legs to or clearing call legs from the MS, has some advantages over other methods. Some of the possible advantages may include (1) allowing it to be the AS to determine when assigned MS resources are no longer needed, as opposed to the MSRB inferring it from call clearing messages—which, for example, may be useful in a conferencing situation; (2) allowing for the AS to revise a request for more or less or different resources for a call or collection of calls; (3) allowing for resource negotiation between the AS and MSRB; (4) allowing for a conference call to span multiple MS physical units and have the AS be the network element that links them together and manages the conference as a whole. The indirect method can also be used in an IVR solution. One possible disadvantage of the indirect method in a case where an IVR service is being provided, (in such a scenario it can generally be safely inferred that the MS port can be freed up when the call is cleared), is that there may be a greater delay in determining that an MS port can be freed. However, the indirect method allows the AS to have greater control over how the resources are allocated and reduces the burden on the MSRB and these benefits may outweigh any disadvantage.

The interaction between AS and MSRB can be fundamentally regarded as database requests and responses, where MSRB is the database. While the above discussion provides details regarding the communication between the AS and MSRB via the CCE using SIP, in an alternative embodiment, the AS and MSRB may communicate directly. In an embodiment, the AS and MSRB may communicate using HTTP instead of SIP. For example, the AS may use HTTP GET messages to request MS resources and HTTP POST messages to have MSRB return them to the idle pool. As can be appreciated, any other suitable protocol for direct communication between the AS and MSRB may also be used.

Figure 4:
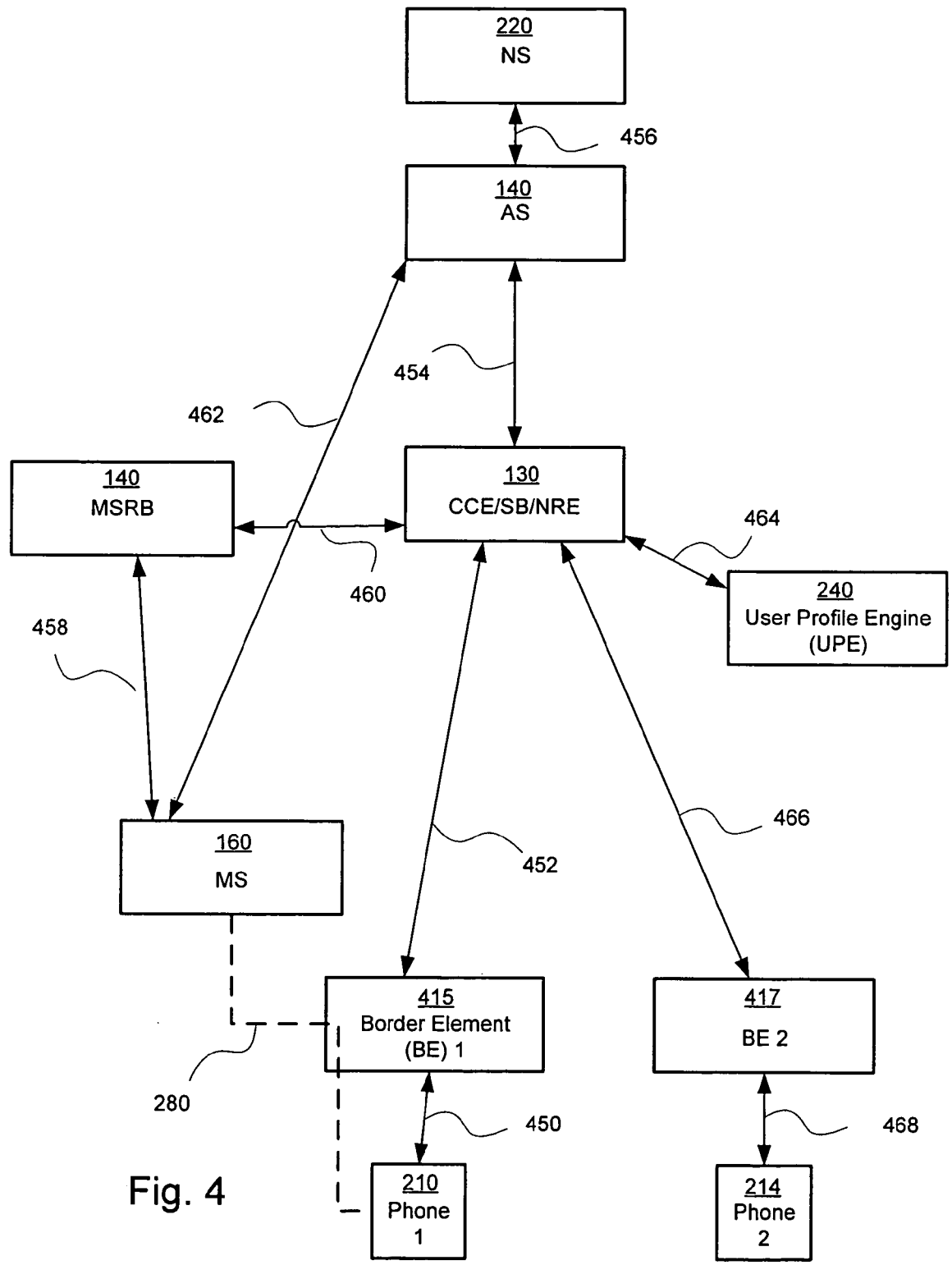
FIG. 4 illustrates a schematic of an embodiment of a system for use in distributing VOIP using a relay method in accordance with an aspect of the present invention.
Figure 5:
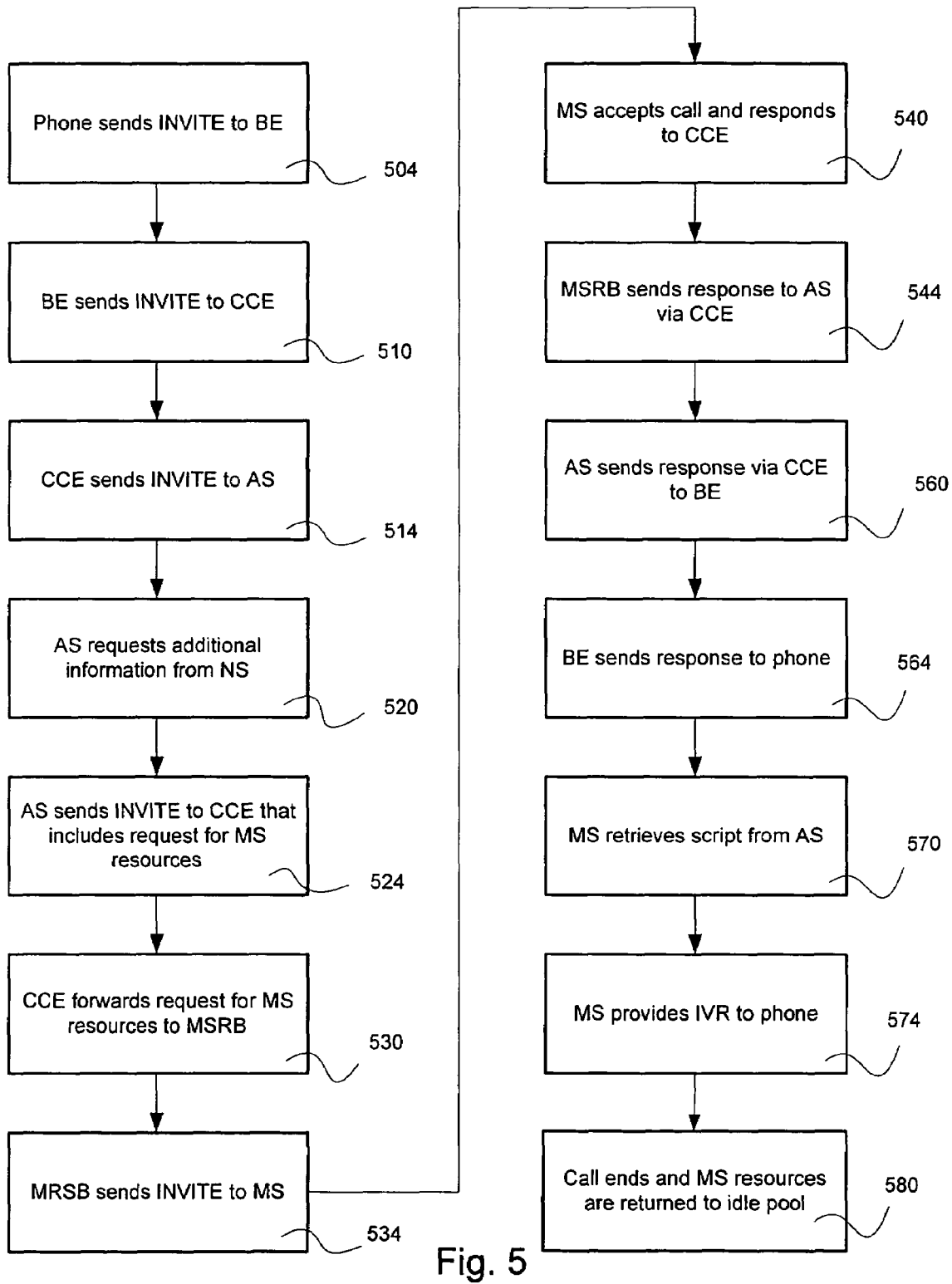
FIG. 5 illustrates an embodiment of a method of using the system depicted in FIG. 4 in accordance with an aspect of the present invention.

Turning to FIGS. 4 and 5, an alternative embodiment of a method of handling incoming calls is illustrated. Steps 504 through steps 520 are essentially the same as steps 305 through steps 320 in FIG. 3. In step 524, the AS 140 sends an INVITE to the CCE 130 that is both together a request for MS resources for that call and a request to establish that call to a MS. In step 530, the CCE 130 forwards the request for MS resources and call establishment to the MSRB 140 and the MSRB 140 determines that MS 160 is the appropriate MS in light of the request and known/planned utilization. In step 534, the MSRB 140 sends an INVITE message to MS 160 to set up the call leg. In step 540, the MS 160 responds to the MSRB 140 accepting the incoming call request. In step 544, the MSRB sends the response message to the AS 120 through path 460 so that the information passes through the CCE 130. In step 560, the AS 120 sends a call setup response message via the CCE 130 to the BE 415. In step 564, the BE 415 provides a call setup response messages to the phone 210. In step 570, the MS 160 retrieves a script from AS 120. In step 574, the MS 160 sends audio to the phone 210 over link 280 so as to begin to the interactive service. In step 580 the call ends and the MSRB 140 infers from the SIP clearing signaling that the MS resource can be returned to the idle pool.

As can be appreciated, the MSRB 140 relays call establishment requests from the AS 120 to the MS 160. Thus, for services such as IVR, the embodiment of this "relay" method depicted in FIGS. 4-5 provides a different interaction with the MSRB than the embodiment of the indirect method depicted in FIGS. 2-3. The relay method allows the MSRB to more quickly determine when MS resources can be returned to idle in the case where it can be inferred from observing call clearing, and it involves fewer steps between the AS and MSRB than does the indirect method. However, the relay method may be more restrictive than the indirect method with regard to the amount of control that an AS can exert, as previously described.

Figure 6:
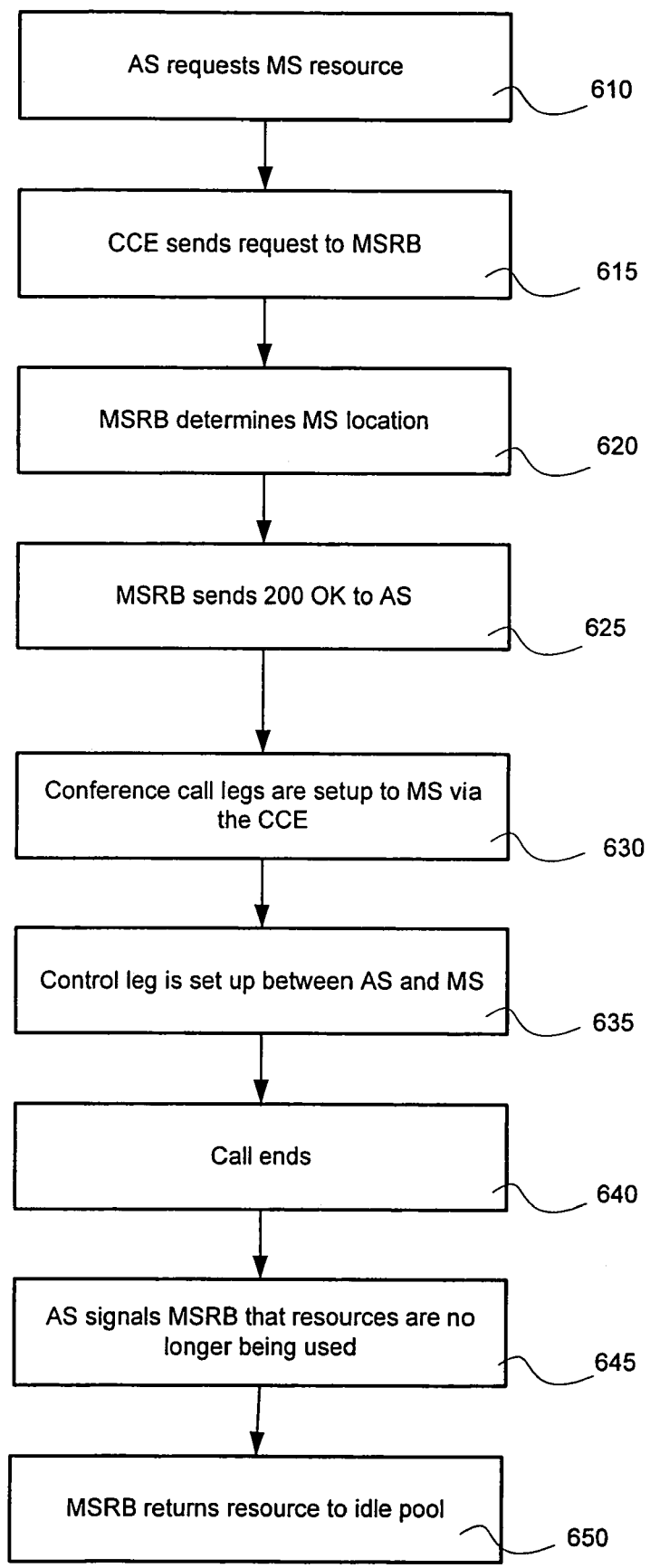
FIG. 6 illustrates an embodiment of an indirect method in accordance with an aspect of the present invention.
Figure 7:
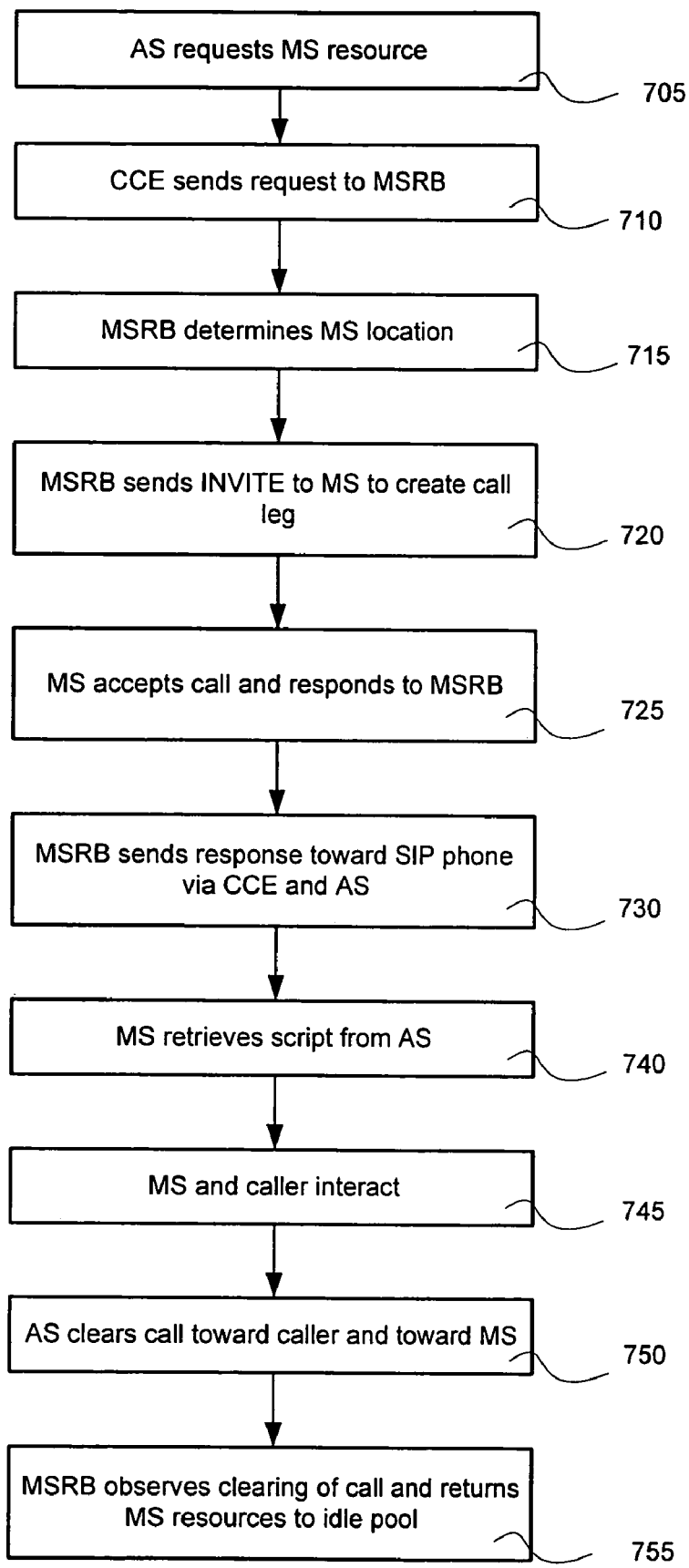
FIG. 7 illustrates an embodiment of a relay method in accordance with an aspect of the present invention.

FIGS. 6 and 7 provide additional illustrations of indirect and relay methods, respectively. As can be appreciated, both methods have certain advantages.

Looking first at FIG. 6, in step 610, an AS requests MS resources. In an embodiment, the request may be to initiate a conference call including X number of ports. In step 615, the CCE forwards the request to the MSRB (which, as noted above, may be one or more physical servers sharing a single logical database). In step 620 the MSRB determines the MS location. This determination can include a geographical component so as to minimize transmission delays. In step 625, the MSRB sends a 200 OK signal to the AS via the CCE with the address of the MS.

In step 630, the CCE sets up call legs between the MS and the various phones at the request of the AS. In step 635, a control leg is set up between the AS and the MS. The control leg allows the AS to provide instructions to the MS, such as muting all but the speaker's leg voice input, or playing an announcement to all the conference legs, or creating a sidebar conference, or mixing the input from the N loudest legs. Furthermore, if all the reserved ports are being used, the AS can request additional ports. This typically is not an issue because often the request may include some additional ports to provide a safety factor. To further protect against running out of ports, a percentage of the requested number of ports can be tentatively assigned for the call period and once the AS determines the ports are not needed they can be released for other usage. It should be noted that if the extra ports, which would act as a buffer against a higher than expected level of participation in the call, are provided, they may be shared with more than one call.

In step 640, the call ends. This can be determined by the termination of the final call leg. Once the call ends, in step 640, in step 645 the AS signals the MSRB that the resources may be unassigned. In an embodiment the signal may be a BYE message. In step 650 the previously assigned MS resources are return to the idle pool.

Turning now to FIG. 7, a high level illustration of a relay method is depicted, again assuming a conference call scenario. In step 705, when the first call leg for the conference comes into the network, the AS requests a MS resource in the same message in which it requests that that call leg be established to a MS. The request should include the type of MS resources needed and the number of ports needed. The request may also include information about the geographic region of the caller as well as the expected time of the call, if known. In the depicted embodiment, the request is in the form of an INVITE message sent to the CCE. In step 710, the CCE sends an INVITE message to the MSRB with the same request information. In step 715, the MSRB determines the location of the appropriate MS and tracks the assignment in the MSRB database so that the assignment of the MS is kept current.

Next, in step 720 the MSRB sends an INVITE message to the MS to create the call leg. As can be appreciated, less information may be provided to the MS because the MS does not have to determine its availability versus other MSs. In step 725, the MS responds to the MSRB by sending a response message to the call setup request that indicates acceptance of the call (e.g., 200 OK). In step 730, the MSRB provides this information to the CCE so that the caller can be connected to the MS. It should be noted that the signaling path passes through the AS on the way to the CCE, thus the signaling path from the phone to the MS passes from BE to CCE to AS to CCE to MSRB to MS.

In step 740, the MS retrieves the script and any needed files from the AS. The script may be in a VXML format and the retrieval can be accomplished via HTTP or some other appropriate protocol. In step 745, the caller and the MS interact. The media interaction, which may take place on the link 280 (FIG. 4) between the MS and the phone, may use any appropriate protocol such as RTP for transmitting the audio stream in a known manner.

Once the interaction is complete, in step 750 the AS clears the call toward the MS and the caller. In step 755, the MSRB observes the clearing of the call and returns the MS resources to the idle pool. As can be appreciated, as the MSRB is in the signaling path for clearing the call, the MSRB receives rapid notification that the port is no longer being used in cases where it can be inferred from the clearing of the call leg. However, for a large conference call, the fact that the MSRB is in the signaling path of each call leg may tend to increase the workload of the MSRB.

Therefore, the indirect methods can allow the AS to have greater control over how the ports are being used and may be preferable, for example, for handling large conference calls. However, the relay method may be able to provide a quicker update on the status of each call leg and may be preferable for handling IVR type calls. It should be noted, however, that neither method is limited to a particular type of call.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method of providing services to an IP node comprising:
    (a) receiving a service request from the IP node in an application server;
    (b) requesting a media server resource from a media server resource broker in response to the service request;
    (c) determining with the media service resource broker that a first media server is available to meet the service request, the first media server selected from a set of media servers in response to the request for a media server resource and one or more parameters related to utilization of the media servers in the set of media servers, the determining including determining the first media server to provide the requested media server resource based on a number of available ports suitable to provide the requested media server resource in each of the media servers in the set of media servers;
    (d) connecting the first media server with the IP node through the media server resource broker, the connecting providing an IP address and port number for use in establishing a call between the first media server and the IP node;
    (e) establishing a call between the IP node and the first media server; and
    (f) providing instructions for managing the call to the first media server from the application server,
    wherein one of the one or more parameters is a current amount of the used and unused capacity of the first media server.

2. The method of claim 1, wherein the set of media server includes media servers located in separate geographical regions.

3. The method of claim I, wherein the service request in (a) is provided in a protocol selected from a list of: Session Initiation Protocol, H.323, Media Gateway Control Protocol, Skinny Client Control Protocol, MiNet, CorNet-IP, Inter-Asterisk exchange Protocol, SKYPE™, and JAJAH™.

4. The method of claim 1, wherein the requesting in (b) is made directly from the application server to the media server resource broker using HyperText Transport Protocol.

5. The method of claim 1, wherein the requesting in (b) comprises:
   (i) sending an INVITE message to a call control element; and
   (ii) sending a second INVITE message from the call control element to the media server resource broker.

6. The method of claim 1, wherein the requesting in (b) includes one or more attributes selected from the list consisting of: nature of the media server usage, number of ports needed, type of customer-subscribed service, characteristics of a needed port, duration of port usage, conference call identification, geographical preference for the location of the media server, and preference for the control protocol to be used.

7. The method of claim 1, wherein one of the one or more parameters in (c) is selected from the list consisting of: a capability of each media server in the set, a number of ports available in each media server in the set, a geographical location of each media server in the set, a current utilization of each media server in the set, and a scheduled utilization of each media server in the set.

8. The method of claim 1, wherein the establishing of the call in (e) uses a Real-time Transport Protocol.

9. The method of claim 1, wherein the first media server comprises a plurality of media servers.

10. The method of claim 1, wherein the providing of instructions in (f) comprises:
   (i) sending commands using a language selected from the list of: Media Session Markup Language, Media Object Markup Language, Media Server Control Markup Language, Voice extensible Markup Language, Call Control extensible Markup Language, and Media Resource Control Protocol.

* * * * *